(12) United States Patent
Lawton et al.

(10) Patent No.: US 6,920,610 B1
(45) Date of Patent: Jul. 19, 2005

(54) METHOD AND SYSTEM FOR BROWSING A LOW-RESOLUTION IMAGE

(75) Inventors: Daryl Lawton, Redmond, WA (US); Alexandra W. Loeb, Seattle, WA (US); Henry W. Burgess, Woodinville, WA (US); Eric J. Feigin, Washington, DC (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/260,837

(22) Filed: Mar. 2, 1999

(51) Int. Cl.[7] .............................................. G06F 15/00
(52) U.S. Cl. ..................... 715/526; 715/513; 715/515
(58) Field of Search ................................. 715/526, 515, 715/513; 707/526, 515, 513

(56) References Cited

U.S. PATENT DOCUMENTS 5,669,007 A * 9/1997 Tateishi ....................... 707/513
6,272,484 B1 * 8/2001 Martin et al. .................. 707/1

OTHER PUBLICATIONS

GroupLab The University of Calgary, "Awareness Through Fisheye Views in Relaxed WYSIWIS Groupware", 1996.*
AdobeSystems Inc, Adobe FramMaker and SGML 5.5, 1997.*
Adobe Systems Inc, Adobe Acrobat 3.0 Online Guide, 1994.*
Edupage Newsletter, Feb. 4, 1997, "The Eyes have Had It".*
HTML tags at a glance, http://www.occdsb.on.ca/~pih/teacherinfo/HTMLtags.htm.*
W3C Working Draft "Scalable Vector Graphics (SVG) Specification", Feb. 11, 1999.*
Adobe Systems Ince, Framemaker 6.0 and XML: The Future of Multichannel Publishing, 2000.*
Planet PDF, "XML and PDF: Of applications and philosophy", Gordon Kent., http://www.planetpdf.com/mainpage.asp?webpageid+831.*
W3C, Document Object Model Level 1 Specification, 1998. Available: http://www.w3.org/TR/1998/REC-DOM-Level-1-19981001/.*
Adobe Systems Incorporated. "Adobe Acrobat 3.0 Technology: A Mini-White Paper for Developers" [web page] 1998. http://www.adobe.com/proindex/acrobat/devwhitepaper.html [accessed Jan. 12, 1999].
World Wide Web Consortium. "Level 1 Document Object Model Specification Version 1.0" [web page] Jul. 20, 1998. http://www.w3.org/TR/1998/WD-DOM-19980720 [accessed Nov. 17, 1998].
Tenax Software Engineering. "Cornix Discussion Page and Demonstration" [web page] 1997. http://www.vallier.com/tenax/cornix.htm1 [accessed Nov. 2, 1999].
Microsoft Corporation. "Web Workshop—Frontpage Tutorial: Creating a Photo Album" [web page] 1999. http://www.msdn.microsoft.com/workshop/languages/fp/2000/tutorial2000/004Ifp.asp [accessed Nov. 3, 1999].

* cited by examiner

Primary Examiner—Joseph Feild
Assistant Examiner—Rachna Singh
(74) Attorney, Agent, or Firm—Leydig, Voit & Mayer, Ltd.

(57) ABSTRACT

A system for retrieving information from a document. The system includes a document model representative of the document having a plurality of data structures representative of components within the document and a thumbnail image registered with the document model. The registration is accomplished by mapping selected coordinates within the thumbnail image to a data structure selected from the plurality of data structures. In this manner, a user can interact with the thumbnail image coordinates to retrieve data from the document as a function of the components mapped to those coordinates. In a further embodiment of the invention, the retrieved information may be streamed to a word-at-a-time display. This is particularly useful when used in connection with the display of low-resolution images on handheld devices.

23 Claims, 7 Drawing Sheets

METHOD AND SYSTEM FOR BROWSING A LOW-RESOLUTION IMAGE

FIELD OF THE INVENTION

This invention relates generally to the field of information display and, more particularly, relates to a method and system for browsing or rapidly accessing the contents of a low-resolution image.

BACKGROUND OF THE INVENTION

It is known in the computer art to use a thumbnail image to provide a representation of a full-sized image stored on a computer. In its current embodiment, the thumbnail image is merely a low-resolution version of the full-sized image created, for example, by sub-sampling the full-sized image. Associated with the thumbnail image is a link, such as a hyperlink. The link may be used to access the computer storage location of the full-sized image counterpart of the thumbnail image whereby the full-sized image may be retrieved and displayed.

To retrieve the full-sized image, a user is typically required to interact with the displayed thumbnail image. This interaction is often accomplished by positioning a cursor over a portion of the thumbnail image. Once the cursor is positioned over the thumbnail image, the thumbnail image may be selected, for example, by clicking an appropriate mouse button. In response to this interaction, the application associated with the display of the thumbnail image, such as a Web browser, initiates the retrieval of the entire full-sized image from its storage location. Once retrieved, the entirety of the full-sized image is available for display.

Methods for creating thumbnail images are also well known in the art. By way of example, Microsoft's "FRONTPAGE" brand Web site creation and management tool provides the software needed to create thumbnail images. Using the "FRONTPAGE" brand editor, the user selects a full-sized image on a page and chooses "Auto Thumbnail" from the "Tools" menu. In response to this selection, the "FRONTPAGE" brand editor creates the thumbnail image as well as a hyperlink to the full-sized image. Once the thumbnail and link are created, the full-sized image remains accessible to the end user through activation of the thumbnail image in the manner described above.

The use of thumbnail images to represent full-sized images has many advantages. For example, a primary advantage associated with the use of thumbnail images is a conservation of system resources, such as network bandwidth, CPU processing time, etc. This conservation of system resources results from the low-resolution nature of the thumbnail image that minimizes the amount of information that is required to be initially downloaded and displayed. Accordingly, a system can accommodate the downloading and display of multiple thumbnail images representing multiple full-sized images, such as pages of a document, using relatively smaller amounts of system resources when compared to the amount of system resources required to present the same information in its full-sized format.

While the representation of full-sized images through the use of low-resolution thumbnail images provides the advantages noted above, there still remains drawbacks associated with their use. For example, the low-resolution thumbnail image representation of the full-sized image is often of such poor quality that a user is not able to discern what information is actually contained within the counterpart full-sized image. This is particularly true of images containing text and associated high frequency information. Furthermore, since activation of the thumbnail image results in the downloading of the entire file comprising the full-sized image, the primary benefit associated with the use of thumbnail images, namely conserving system resources, is effectively defeated.

Accordingly, a need exists for an improved method and system for using a thumbnail image to display information. In particular, a need exists for a method and system for use in browsing information presented to a user in the form of a low-resolution image. This is especially desirable for use in connection with hand-held devices, such as personal digital assistants, where there is limited screen real-estate.

SUMMARY OF THE INVENTION

In accordance with this need, the invention is generally realized in a system for retrieving information from a document. The system includes a document model having a plurality of data structures representative of the components within the document and a thumbnail image registered with the document model. The registration is accomplished by mapping selected coordinates within the thumbnail image to a data structure selected from the plurality of data structures. A user can interact with the thumbnail image coordinates to retrieve information from the document as a function of the component(s) mapped to those coordinates. In a further embodiment of the invention, the retrieved information may be streamed to a word-at-a-time display while the thumbnail image is altered to provide a user with an indication of the context of the streamed information.

In this manner the invention allows a user to interact with the low-resolution thumbnail to extract detailed information from a document without having to view the original full-resolution image of the document. Furthermore, the invention supplies navigation context to word-at-a-time displays.

Additional features, advantages and objects of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
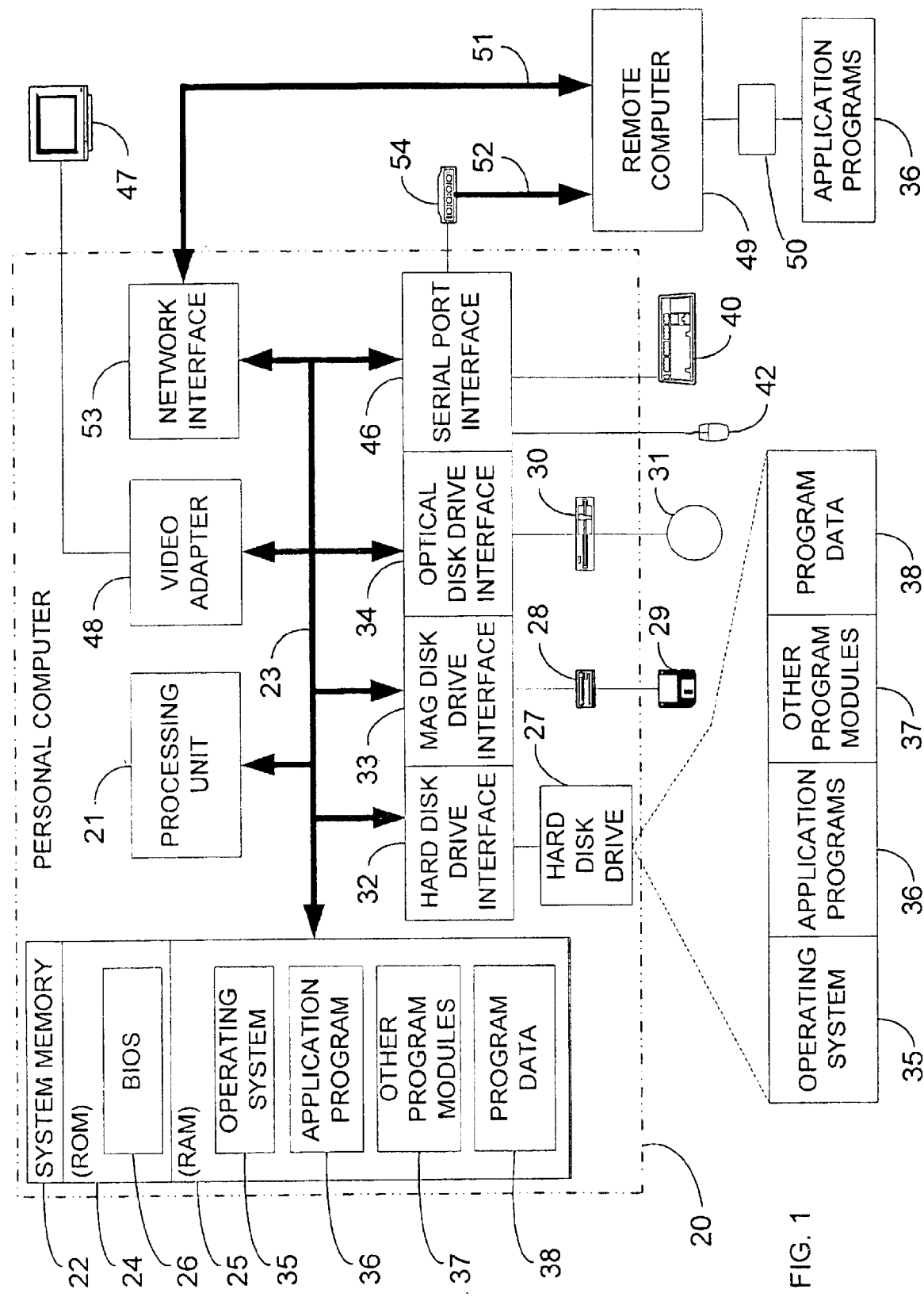
FIG. 1 is a block diagram illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer, hand-held computer, or the like. Generally, program modules include routines, programs, objects, components, data structures, etc. that perform particular tasks or implement particular abstract data types. Moreover, those skilled in the art will appreciate that the invention may be practiced with other computer system configurations, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive ~30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program module s depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, a rendered view of a document in the form of a bitmap image or "smart thumbnail" is provided as a representation of a document stored within the computer system, hand-held computer, or the like. In this manner, it is possible for a user to interact with the smart thumbnail to gain access to the organization, components and associated behavior of the document. Additionally, the rendered view of the document can be generated using information in the associated document model as an additional way to present to the user meaningful information about the document.

To allow the user to gain access to the organization, components and associated behavior of the document, the smart thumbnail is registered with the document. More specifically, the smart thumbnail is registered with a data structure representative of the document generically referred to as a "document model."

The document model consists of data structures containing data representative of components such as text, images, vector graphics, and/or multimedia components that are composited together to form the underlying document. The document model may also includes data structures representative of the component layout that describe how the components that comprise the document are spatially arranged in the rendered image of the document. The component layout may also include data representative of presentation information that describes the preferred ordering of the components when they are sequentially presented.

Figure 2:
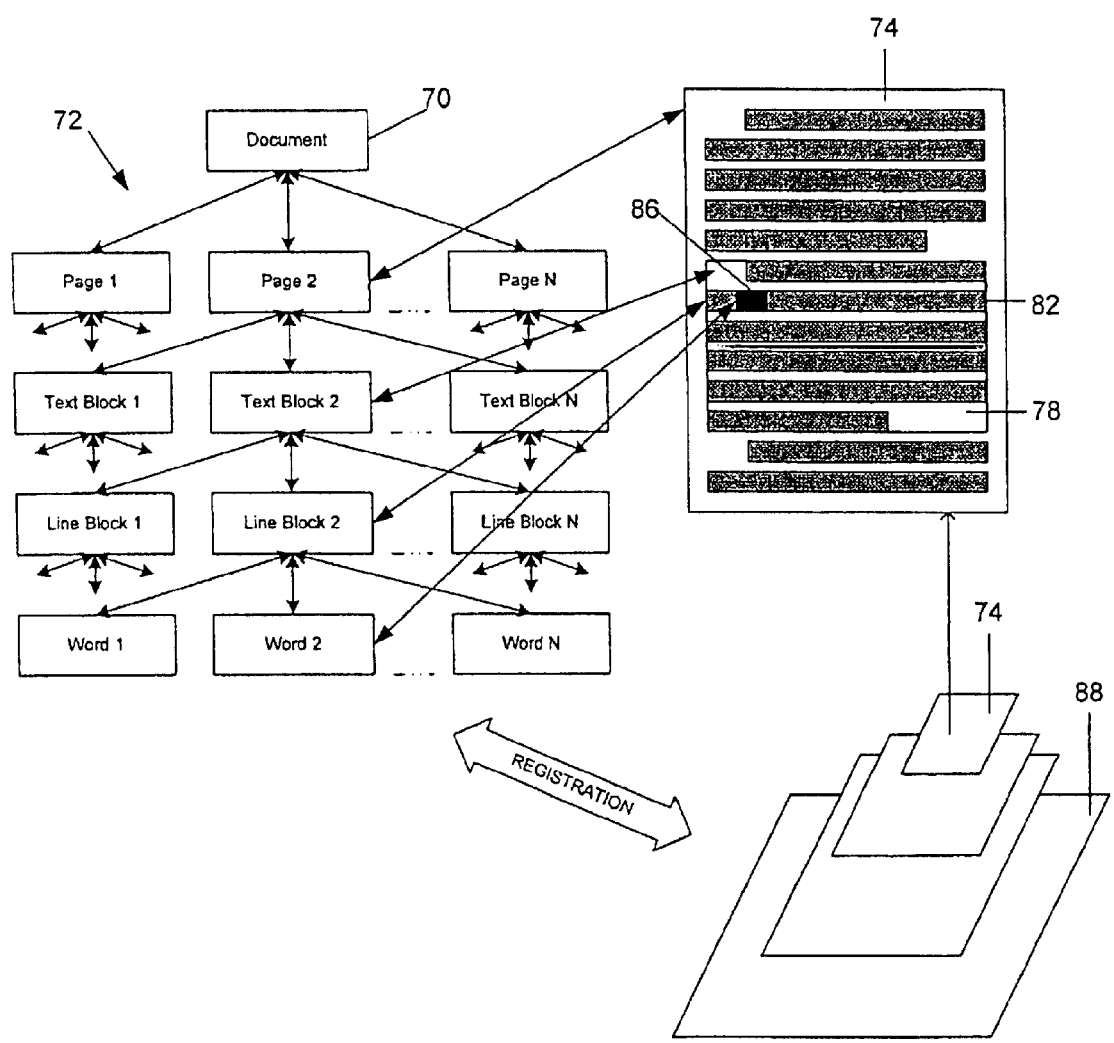
FIG. 2 is a block diagram illustrating a registration between a Document Model and a smart thumbnail in accordance with the present invention.

As illustrated in FIG. 2 and by way of example only, a simple text document 70 can be described using a document model 72 having components of increasingly more specific semantic units. In the example provided, the components are pages, blocks of text, lines of text, and words. Preferably, the highest component level is the text document itself while the lowest component level is words. In this manner, the document 70 can be described as having a number of page components (Page 1 ... Page N), each page component can be described as having a number of textual block components, e.g., paragraphs, (Text Block 1 ... Text Block N), each textual block component can be described as having a number of textual line components (Line Block 1 ... Line Block N), and each textual line component can be described as having a number of word components (Word 1 ... Word N). Preferably, the data structures representative of these components are each provided with an address such that links may be used to gain access to the components on an individual basis.

For registering the smart thumbnail image to the counterpart document, selected coordinates within the smart thumbnail image are mapped to selected components using layout information in the document model 72. By way of example, FIG. 2 illustrates a smart thumbnail image 74 that is a low-resolution image representative of the text document 70. The smart thumbnail may be registered with the document model by mapping: 1) all of the coordinates within the smart thumbnail 74 to a page component selected from the document model 72; 2) coordinates defining a region 78 within the smart thumbnail 74 representative of a paragraph to a textual block component selected from the document model 72; 3) coordinates defining a region 82 within the smart thumbnail 74 representative of a line of text to a line block component selected from the document model 72; and/or 4) coordinates defining a region 86 representative of a word to a word component selected from the document model 72.

Figure 3:
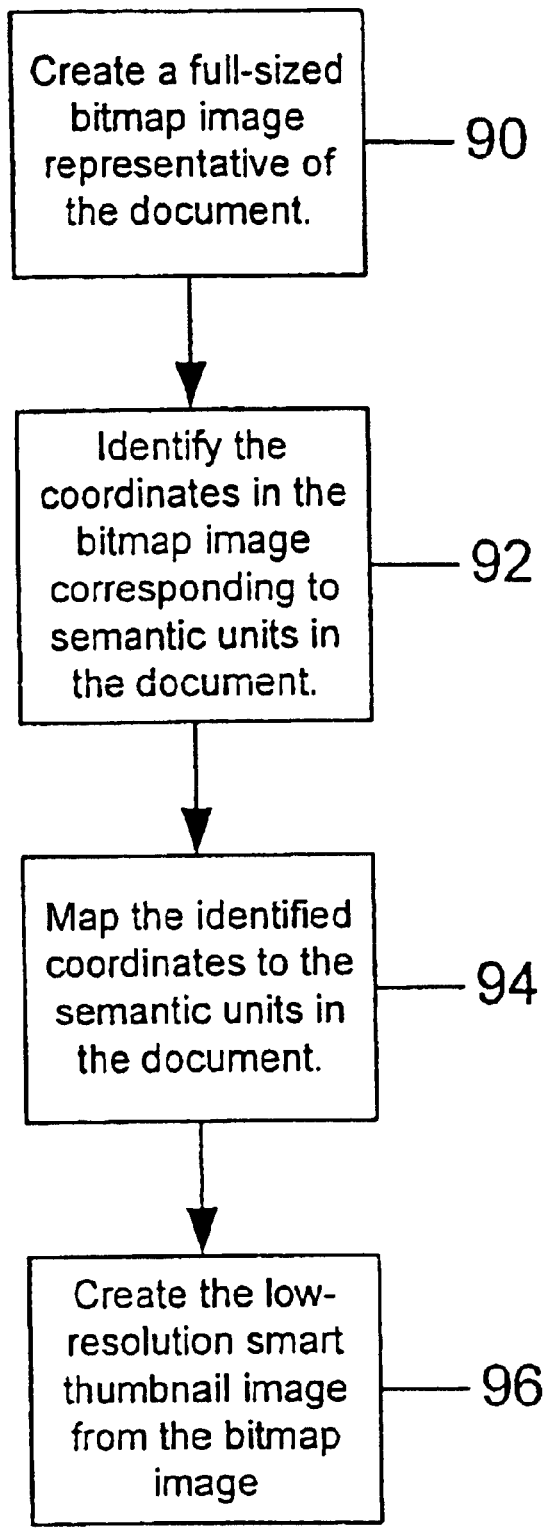
FIG. 3 is a flow chart diagram illustrating a method for creating the smart thumbnail of FIG. 2.

More specifically, as illustrated in FIGS. 2 and 3, the registration of the smart thumbnail 74 to the document model 72 may be performed by creating in step 90 a full-sized bitmap image replica 88 of the document. Alternatively, in step 91, the full-sized bitmap image replica 88 can be generated using the layout information in the document model 72. Still further, the full-sized bitmap image replica 88 could be generated using an internal representation of the document created, for example, in the printing process.

Within the full-sized bitmap image 88, coordinates of the bits that are representative of selected components from the document model 72 are identified in step 92. For example, the coordinates of a rectangle in which reside those bits that together give the appearance of a word are identified. In step 94, the identified coordinates are mapped to a corresponding component selected from the document model 72. This mapping preferably provides the identified coordinates with a link to the address of the components to which the coordinates are mapped.

Once the full-sized bitmap image has been mapped to all of the desired components, the smart thumbnail 74 low-resolution image is created in step 96 from the full-sized bitmap image 88. As will be appreciated by those of skill in the art, the creation of the low-resolution image may be performed by sub-sampling the full-sized bitmap image 88 using, for example, a multi-resolution pyramid technique or the like. During this process, the coordinates within the full-sized bitmap image 88 that are mapped to the components are translated to the scale of the low-resolution image. In this manner, the smart thumbnail 74 is registered with document model 72. In FIG. 2, the layered pyramid corresponds to different resolutions of the image of the associated document. The higher up the pyramid, the smaller the image becomes. The smallest image is shown as corresponding to the thumbnail.

For generating the bitmap image in accordance with step 90 of FIG. 3, various tools known in the art are available for use. For example, Optical Character Recognition (OCR) tools can be used in conjunction with document description formats to generate information pertaining to positions of text within a rendered image of a simple text document. Similar information may be generated using known document-processing techniques which analyze a scanned document into a hierarchical set of groups without performing explicit OCR character recognition. This positional information may then be used to map the identified coordinates to the appropriate semantic units selected from the document model 72.

To allow a user to interact with the smart thumbnail 74, the smart thumbnail is presented on the display 47 associated with computer 70 of FIG. 1. In this manner, a user can manipulate a display cursor, using the mouse 42, keyboard 40, or the like, to indicate a specific position within the displayed smart thumbnail 74 for which more detailed information is desired to be retrieved. The smart thumbnail 74 can be presented to the user in connection with any number of application programs 36 such as, for example, an Internet browser application, a word processing application, a spreadsheet application, or like type of application whose underlying function is information presentation.

Figure 4:
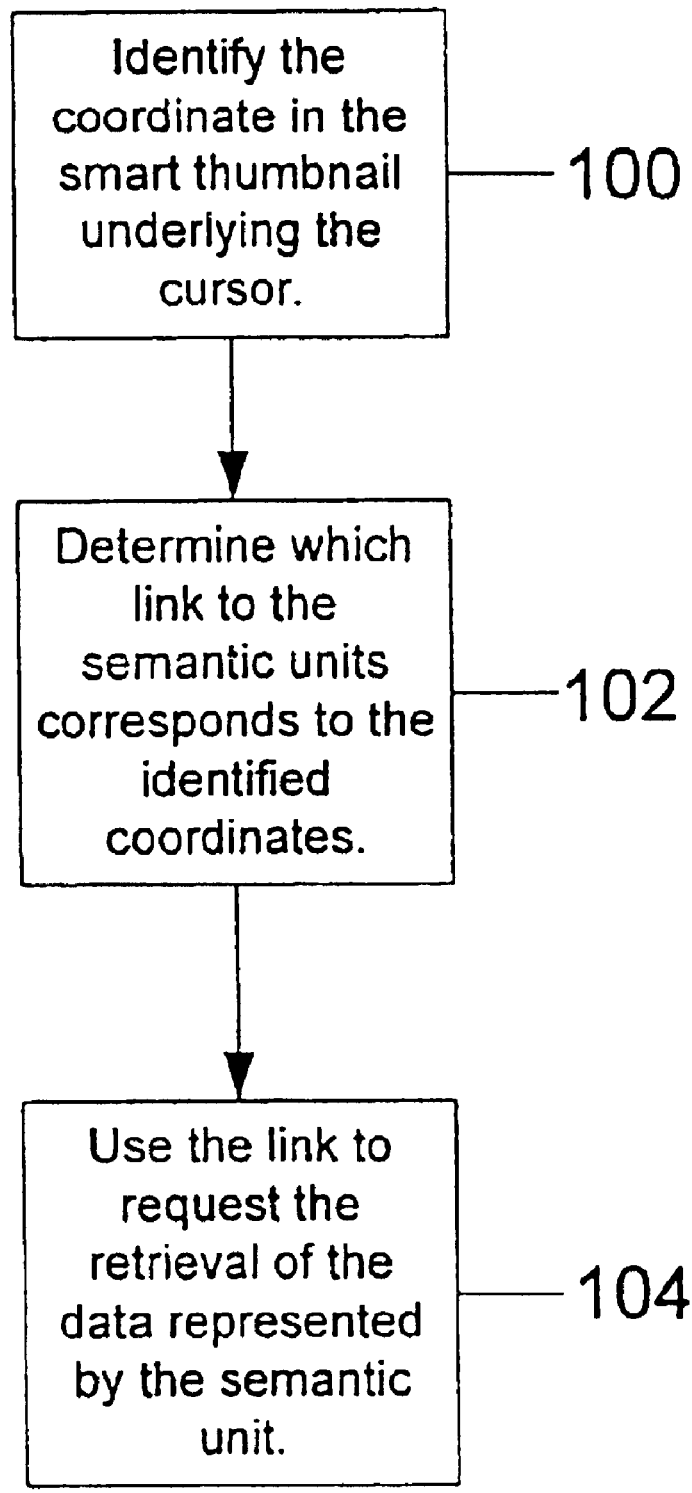
FIG. 4 is a flow chart diagram illustrating a method for retrieving information using the smart thumbnail of FIG. 2.

For retrieving the detailed information related to the positioning of the cursor, the coordinate in the smart thumbnail 74 that underlies the position of the cursor is determined as illustrated in step 100 of FIG. 4. It will be appreciated that determining the coordinate in the smart thumbnail 74 underlying the position of the cursor likewise allows the link to the component mapped to that coordinate to be identified as shown in step 102. Thus, using the identified link, the application displaying the smart thumbnail can issue a request in step 104 that the data represented by the component associated with the identified link be retrieved for subsequent display to the user. Returning to FIG. 2 and by way of example, if the user were to position the cursor over the coordinates that define the region 86 within the smart thumbnail 74, data represented by the page component, textual block component, textual line component, and/or word component can be retrieved and displayed to the user. The information retrieved depends upon which of the component(s) selected from the document model 72 were mapped to the region 86.

From the foregoing, it will be appreciated that the use of smart thumbnails allows for the retrieval and viewing of information selected from a document without having to download the entirety of the counterpart document image. Thus, among other things, the subject invention has the advantage of improving upon the conservation of resources normally associated with using thumbnails. This ability to retrieve parts of documents also has the advantage of allowing a user to quickly and efficiently discern what is contained in a document corresponding to an unreadable thumbnail image.

For displaying information retrieved from a text document, it is preferred that a word-at-a-time display (WAATD) be used. WAATDs are known in the art and are generally used to present one or more words as a text stream to a viewer in a small, restricted, stationary window. For example, Tenax Software Engineering provides a downloadable Java applet, entitled "Cornix," for use in providing WAATDs on Web pages. Since WAATD allow text documents to be read without requiring a user to move their eyes, WAATDs have been seen to increase reading times by as much as 90%.

Figure 5:
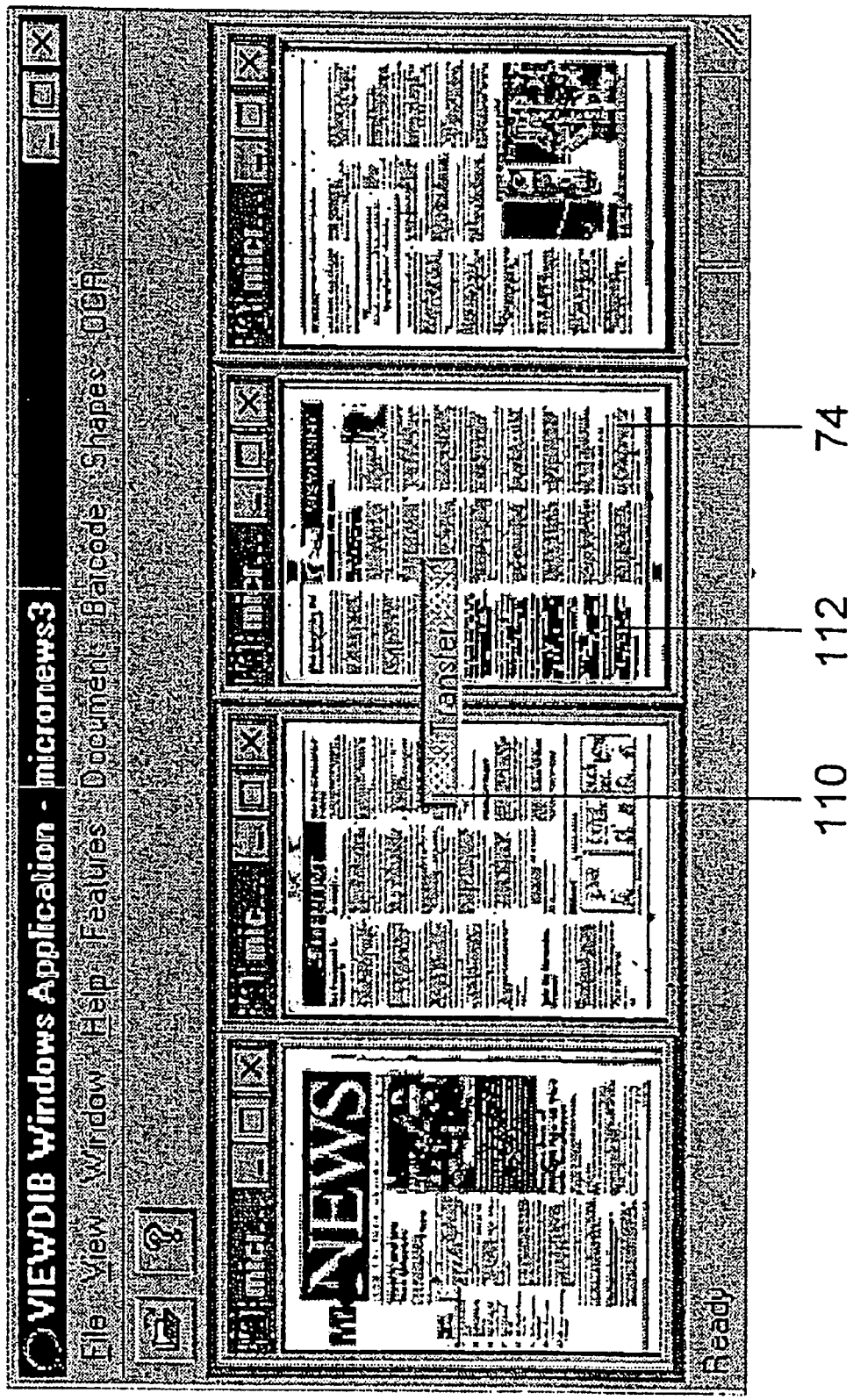
FIG. 5 is a screen shot of an exemplary smart thumbnail and an associated word-at-a-time display created in accordance with the present invention.
Figure 6:
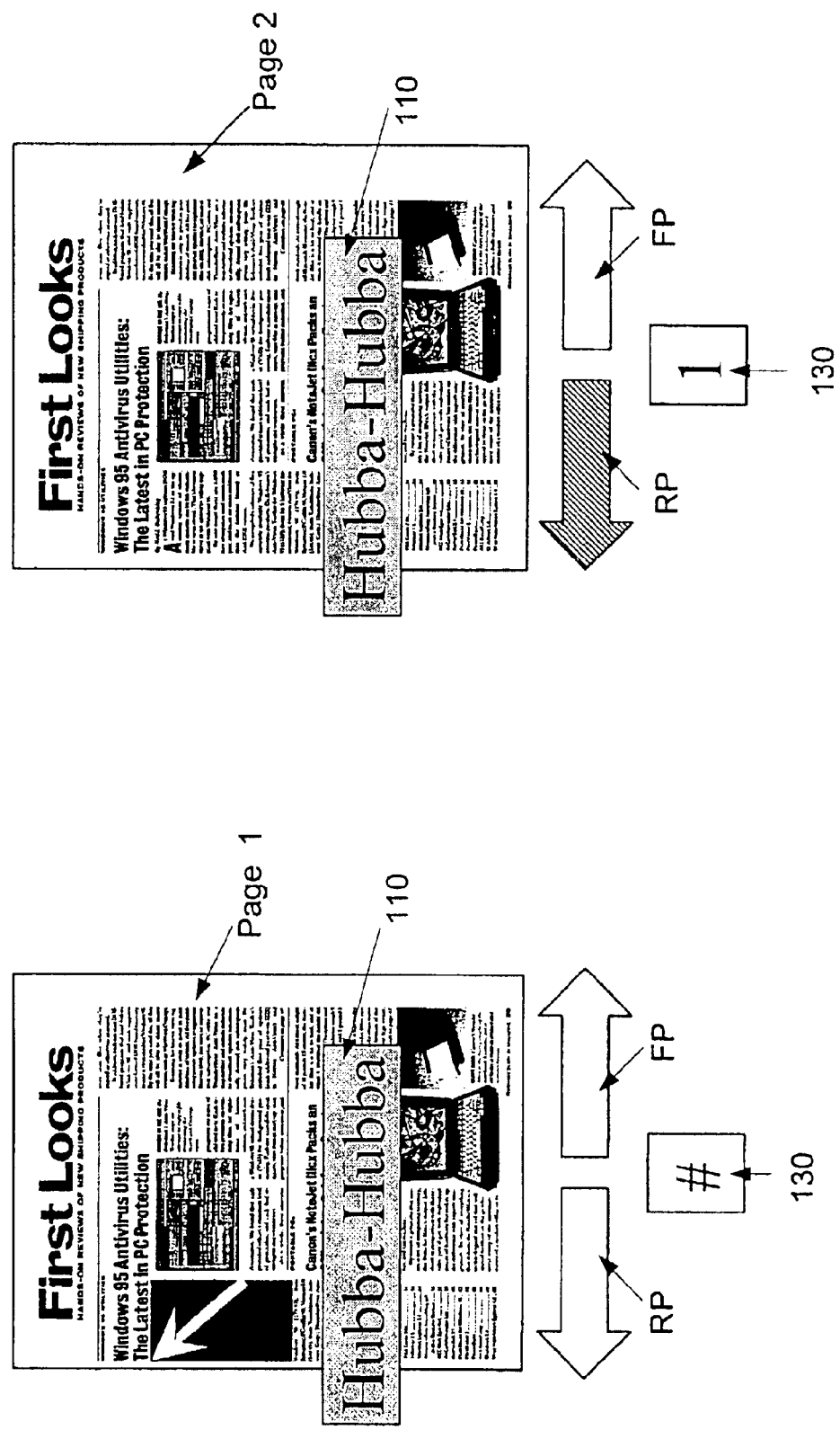
FIG. 6 is a further representation of the exemplary smart thumbnail and the associated word-at-a-time display of FIG. 5.
Figure 7:
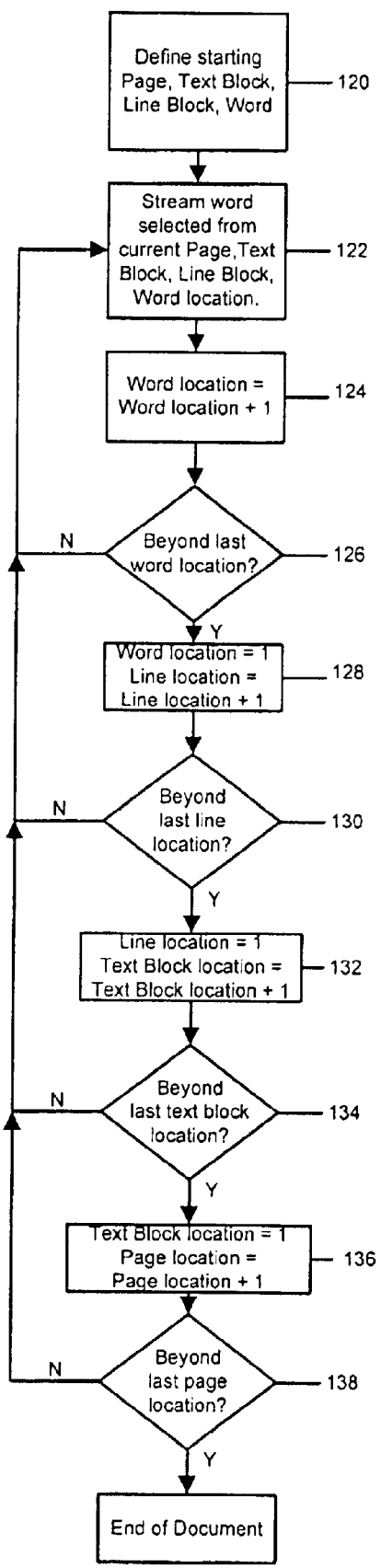
FIG. 7 is flow chart diagram illustrating a method for streaming data to the word-at-a-time display illustrated in FIG. 5.

With reference to FIGS. 2, 5 and 6, the displaying of data retrieved from a document model within a WAATD display 110 is preferably performed as a function of the presentation information maintained in the document model 72. The presentation information may be used to navigate the global hierarchy of the document to stream information to the WAATD 110. By way of example, as illustrated in FIG. 7, given a starting word component within the document model 72, preferably defined in step 120 by the user positioning the cursor over a coordinate in the smart thumbnail, the presentation information may direct that each word component following and including the starting word component within the textual line component that includes the starting word component be streamed to the WAATD in steps 122–126. In steps 128–130, the streaming to the WAATD of the word components can then be repeated for the next textual line component. In steps 132–134, the streaming to the WAATD of the word components from each of the textual line components may be repeated for the next textual block component. In steps 136–138, the streaming to the WAATD of the word components from each of the textual line components from each of the textual block component may then be repeated for the next page component.

Using the method illustrated in FIG. 6, all word components from the starting word component to the last word component in the hierarchy of the document model may be streamed to the WAATD. It will be appreciated, however, that the streaming of word components to the WAATD need not continue until the end of the document. Rather, the streaming of components to the WAATD can be restricted to a delimiter reflecting any unit of document organization. Furthermore, the speed and/or manner in which components are presented within the WAATD can be controlled as a function of the type of component being streamed to the WAATD 110. By way of example, titles could be presented relatively slower than body text or the font, color, etc. of the information displayed may be changed in the WAATD to visually notify to the user that some unique type of information is being presented.

Further use of the document model may also be made for causing single pages of the document to be controllably displayed to the viewer in thumbnail format while being used in connection with the WAATD 110. As illustrated in FIG. 6, a first page component (Page 1) from the document model may be displayed and, in response to a user interacting with a forward page control (FP) and a reverse page control (RP) the next or previous page in the document, respectively, may be displayed. For example, to traverse from the second page component (Page 2) to the first page component (Page 1), the user would interact with the RP control as shown in FIG. 6. An additional field 130 may also be used to display the page number thereby providing page context to the user. This manner of presenting information is particularly advantageous for use in connection with PDAs and other handheld devices having a small amount of display real estate.

While standard WAATDs have the advantage of improving reading time, manufacturers remain reluctant to incorporate WAATDs into products because readers find the use of WAATDs to be sometimes unsettling. For example, readers are often unable to discern from where in the document the streaming words are being extracted. Accordingly, WAATDs tend to be very poor for understanding context relative to overall document organization and navigation. To solve this problem, a smart thumbnail may be utilized in connection with the WAATD 110.

To provide context to the words being streamed to the WAATD 110, a smart thumbnail corresponding to the document from which the streaming words are being extracted may be manipulated so as to indicate to a reader where in the document the streamed text organizationally resides. By way of example and with reference to FIG. 5, the smart thumbnail. 74 can have the coordinates corresponding to the word components that are streamed to the WAATD display change color, be highlighted, etc. 112. In this manner, the smart thumbnail provides visual clues to the reader that function to track the streaming of words to the WAATD.

The altering of the rendition of the smart thumbnail 74 for the purpose of tracking within the context of the smart thumbnail 74 the streaming of words to the WAATD 110 can be accomplished using standard functions from a graphical interface, such as Microsoft's graphical device interface (GDI). It will also be appreciated that the GDI functions can be used to change the rendering of the smart thumbnail in response to other factors such as, for example, highlighting coordinates in the smart thumbnail in response to a query performed on the underlying document model.

More specifically, the rendering information required by the graphical interface functions for effectuating an alteration of the coordinates of the smart thumbnail may be stored as part of the document model 72. In this manner, the document model can be used to control the rendering of the thumbnail to highlight information, for example, using rendering rules such as "use the text block highest on the page and with the boldest font to highlight the title."Using such control, different components can be rendered differently based on their type.

Still further, the WAATD may be used to in connection with a computer, personal digital assistant, or the like to display Web content retrieved from the internet. Preferably, the Web content, in the form of a document model, is streamed to the WAATD one word component at a time as described above. However, when the word component of the Web content document model is further defined to be a hyperlink/button component, the WAATD display can vary the presentation of the hyperlink component to allow a user to interact with the hyperlink component. For example, the WAATD may pause when such a component is displayed to allow the user time to activate the hyperlink. The pausing of the display may continue until the user interacts with the link or otherwise notifies the graphical user interface that the link is not of interest. Still further, the display of the hyperlink may be caused to blink, flash, change color or otherwise visually attract the attention of the user when displayed in the WAATD.

In yet another embodiment, the display of the smart thumbnail may be altered to indicate the presence of a hyperlink. For example, with reference to FIG. 5, one color (blue) could be used to indicate the context of the information streamed to the WAATD with the color changing (to red for example) over those contextual locations corresponding to a streamed hyperlink. In this manner, the user may click on the appropriately colored location of the thumbnail to invoke the hyperlink. Preferably, for hyperlinks that are proximate to one another, a means (such as using multiple colors for example) is used to differentiate the rendering of the hyperlink locales within the thumbnail image to avoid what would appear to the user a one continuous hyperlink.

Still further, the document model may be used to control the order in which information is presented in the WAATD. For example, the first item of information displayed to the viewer could be the nearest title to the location activated on the smart thumbnail, the first word of a paragraph which has been selected by a user, etc. Additionally, the WAATD can be used to cycle through lists or columns of data.

While the invention has been primarily described herein using a simple text document as the exemplary document that is registered with a smart thumbnail, it will be appreciated by those of skill in the art that the invention is not intended to be so limited. Accordingly, the invention described herein contemplates more complex document models wherein the components may be divided into classes such as images, vector graphics, etc. as well as text. As will be further appreciated, these additional components are preferably handled differently than textually based components during the rendering process. For example, images could be displayed in specialized viewers while vector graphics could be independently redrawn thus avoiding the averaged out sampling of the images that would result from the process used to create the smart thumbnail image.

In another preferred embodiment of the invention, the document that is registered with the smart thumbnail is an Extensible Markup Language (XML) document. As will be appreciated by those of skill in the art, XML provides to authors of documents a way of marking up the content of the document using tags that function to semantically organize the document. Consequently XML provides a standard way to better communicate the relevance of the content of the document when the document is registered with the smart thumbnail. For example, using XML, text components within a document can be more specifically characterized using tags that identify the text components as titles, headings, etc. In particular, XSL has been developed in XML to describe document layout which can be used for describing document models. This is described in LEVEL 1 DOCUMENT MODEL SPECIFICATION, VERSION 1.0, W3C Working Draft, Jul. 20, 1998 which is incorporated herein by reference in its entirety.

In view of the many possible embodiments to which the principles of this invention may be applied, it should be recognized that the embodiment described herein with respect to the drawing figures is meant to be illustrative only and should not be taken as limiting the scope of invention.

For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for registering a low-resolution thumbnail image with a document model having a plurality of data structures representative of components within a document, the method comprising the steps of:

creating a full-sized bitmap image representative of the document;

identifying coordinates within the full-sized bitmap image;

mapping selected coordinates within the full-sized bitmap image to components selected from the document model, wherein the document model comprises hierarchically related model components, and whereby hierarchically related document components are associated with corresponding hierarchically related model components; and reducing the full-sized bitmap image into the low-resolution thumbnail image.

2. The method as recited in claim 1, wherein the document is a text document and the components comprise one or more page components, textual block components, textual line components and word components.

3. The method as recited in claim 1, wherein the document is an XML document.

4. The method as recited in claim 1, wherein the step of mapping further comprises the step of providing an address link to a computer storage location between the coordinates and each component selected from the document model mapped to the coordinates.

5. The method as recited in claim 1, wherein the step of identifying further comprises the step of identifying coordinates that define a unit of text.

6. The method as recited in claim 1, wherein the step of reducing further comprises the step of sub-sampling the full-sized bitmap image.

7. A method for retrieving information from a document represented by a thumbnail image having coordinates registered with components selected from a document model having hierarchically related model components representative of hierarchically related components of the document, the method comprising the steps of:

sensing the position of a cursor over the thumbnail image;

determining the coordinates within the thumbnail image corresponding to the sensed cursor position;

determining a component within the hierarchically related model components corresponding to the coordinates within the thumbnail image corresponding to the sensed cursor position; and retrieving data from the document corresponding to the determined component from the document model corresponding to the determined coordinates.

8. The method as recited in claim 7, further comprising the step of streaming to a word-at-a-time display the data retrieved from the document.

9. The method as recited in claim 8, further comprising the step of altering the appearance of the thumbnail image to provide an indication of the information streamed to the word-at-a-time display.

10. The method as recited in claim 8, wherein the step of streaming is continued until a delimiter reflecting a unit of document organization is reached.

11. A computer-readable medium comprising instructions for retrieving information from a document represented by a thumbnail image having coordinates registered with components selected from a document model comprised of hierarchically related model components representative of hierarchically related components of the document, the instructions performing the steps of:

sensing the position of a cursor over the thumbnail image;

determining the coordinates within the thumbnail image corresponding to the sensed cursor position;

determining a component within the hierarchically related model components corresponding to the coordinates within the thumbnail image corresponding to the sensed cursor position; and retrieving information from the document corresponding to the determined component from the document model corresponding to the determined coordinates.

12. The computer-readable medium as recited in claim 11, further comprising instructions for performing the step of streaming to a word-at-a-time display the information retrieved from the document.

13. The computer-readable medium as recited in claim 12, further comprising instructions for performing the step of altering the appearance of the thumbnail image to provide an indication of the information streamed to the word-at-a-time display.

14. The computer-readable medium as recited in claim 12, wherein the step of streaming is continued until a delimiter reflecting a unit of document organization is reached.

15. A computer-readable medium comprising instructions for registering a low-resolution thumbnail image with a document model having a plurality of data structures representative of components within a document, the instructions performing the steps of:

identifying coordinates within a full-sized bitmap image;

mapping selected coordinates within the full-sized bitmap image to components selected from the document model, wherein the document model comprises hierarchically related model components, and whereby hierarchically related document components are associated with corresponding hierarchically related model components; and reducing the full-sized bitmap image into the low-resolution thumbnail image.

16. The computer-readable medium as recited in claim 15, wherein the step of identifying further comprises identifying coordinates that define a unit of text.

17. A hand-held computer, comprising:

a memory adapted to store thereon a document model, representative of a document, the document model having a plurality of hierarchically related data structures representative of hierarchically related components within the document; and a display adapted to display a thumbnail image registered with the document model and a word-at-a-time display;

wherein the thumbnail image is registered with the document model such that selected coordinates within the thumbnail image are each mapped to a data structure selected from the plurality of hierarchically related data structures; and wherein the word-at-a-time display is adapted to display data represented by components selected from the document model in response to interaction with the thumbnail.

18. The hand-held computer as recited in claim 17, wherein the document is a HTML document.

19. The hand-held computer as recited in claim 17, wherein the document model comprises one or more hyperlinks and the word-at-a-time display is adapted to display hyperlinks in a manner that attracts the visual attention of a user.

20. The hand-held computer as recited in claim 18, wherein the manner that attracts the visual attention of the user is flashing the hyperlink in the word-at-a-time display.

21. The hand-held computer as recited in claim 17, wherein the thumbnail image is adapted to track the context of information streamed to the word-at-a-time display.

22. The hand-held computer as recited in claim 21, wherein the document comprises one or more hyperlinks and the thumbnail image is adapted to display the context of streamed hyperlinks in a manner adapted to visually attract a user.

23. The hand-held computer as recited in claim 22, wherein the manner adapted to visually attract the user comprises flashing a portion of the thumbnail image corresponding to the streamed hyperlink.

* * * * *